Aug. 17, 1965        H. B. LAW        3,200,469
SPHERICAL GRIDS AND METHODS OF MAKING SAME
Filed Jan. 28, 1960
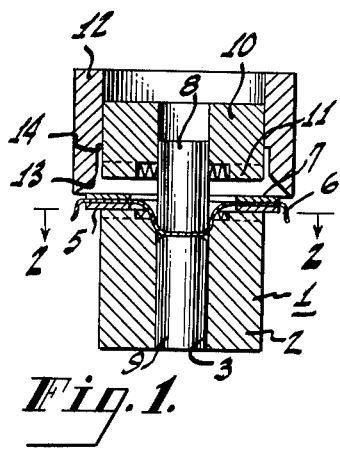
Fig.1.
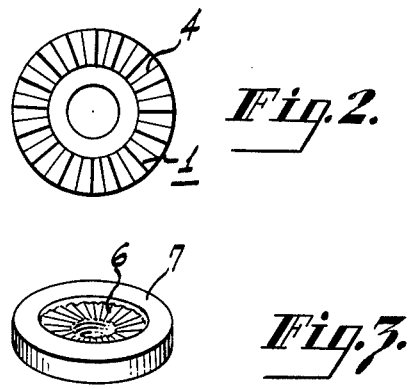
Fig.2.
Fig.3.
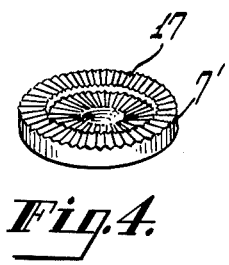
Fig.4.
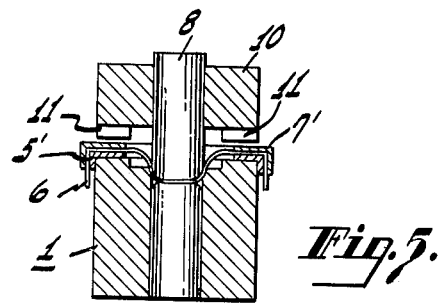
Fig.5.
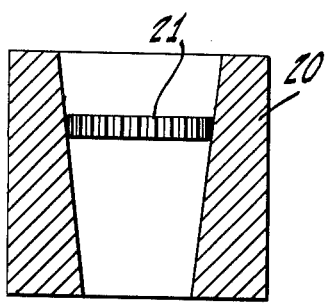
Fig.6.
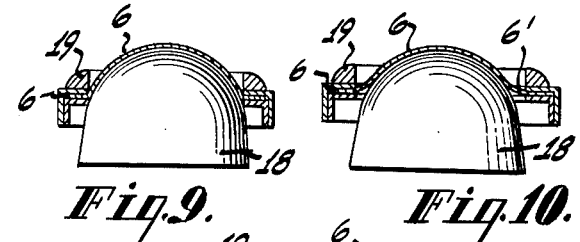
Fig.9.    Fig.10.
Fig.11.
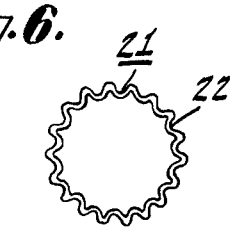
Fig.7.
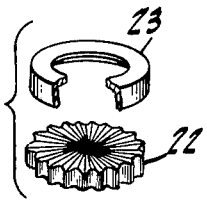
Fig.8.
INVENTOR.
HAROLD B. LAW
BY
William A. Zalesak
ATTORNEY United States Patent Office 3,200,469
Patented Aug. 17, 1965

3,200,469
SPHERICAL GRIDS AND METHODS
OF MAKING SAME
Harold B. Law, Princeton, N.J., assignor to Radio Corporation of America, a corporation of Delaware
Filed Jan. 28, 1960, Ser. No. 5,132
2 Claims. (Cl. 29—25.18)

My invention relates to a method for forming a very thin sheet metal, including fine mesh material, into spherical or partially spherical shapes and particularly to forming fine mesh spherical or partially spherical electrodes for electron discharge devices of the cathode ray type, and to an article made by my method.

In one form of cathode ray tube, a fine mesh electrode of hemi-spherical form is utilized. Forming an electrode of this type presents difficulties since the mesh material used for this purpose has about 500 holes per linear inch and is about two-ten-thousandths (0.0002) of an inch in thickness and therefore very delicate. Forming such material into a dome or spherical shape from a flat sheet by stretching is very difficult since the spherical shape has a considerably greater surface area than the flat disk and since the thin material does not lend itself to sufficient stretching without disruption when an attempt is made to give the material its final spherical form. If sufficient material is used so that the material need not be stretched beyond its disruption point to form it to the desired spherical shape, then extra folds of material may appear at the margins of the spherical grid and the grid will not be of smooth spherical shape which is necessary to obtain desired electrical characteristics.

It is, therefore, an object of my invention to provide a novel method for forming thin sheet material including fine mesh material into spherical or partially spherical form, and to an article made by said method.

More specifically, it is an object of my invention to provide a novel method and apparatus for forming fine mesh sheet material into spherical or partially spherical electrodes for electron discharge devices of the cathode ray type.

A spherical or partially spherical screen may be made according to my invention by loosely gathering fine mesh screen material into a frame, preferably of circular or ring shape, the material being arranged loosely to form a pocket having waves or corrugations therein preferably evenly spaced and arranged in radial directions, and thereafter forming the screen material into the desired shape by simultaneously stretching certain areas thereof and shrinking other areas thereof while in the frame. The material, in its frame, is placed over a form and the stretching and shrinking of the material takes place while the material and frame are heat treated over the form.

I have provided several modifications of my apparatus for gathering the material loosely but evenly into a frame. One form of my apparatus comprises a cylindrical member with a cylindrical hole therethrough, said member having teeth directed radially on one annular end of said tool. For use with this tool, I provide a die having similar shape and mating teeth. I also provide a plunger, which fits the cylindrical hole in the member, for a purpose to be described. For certain modifications of my method, I provide a cylindrical forming tool having a bore therethrough large enough to fit over the die. In still another modification of my invention, I provide a cylindrical tool having smooth edges and having a tapered bore therethrough.

The apparatus used in my heat treating step comprises a hemi-spherical ball and a weighted ring having a diameter of about the same diameter as the frame as will more fully appear below.

My method comprises, in accordance with one of my modifications, laying a frame ring or member over the toothed end of the forming tool but having dimensions such that the inner radial ends of the teeth are exposed, laying the material to be formed, over the ring and laying a further ring or member over the material and then pushing the material into the bore or hole of the forming tool in an even manner whereby the material is gathered within the hole of the forming tool and forms a pocket therein and having radially directed waves or folds. The rings are then fastened together to produce an assembly in which the thin mesh material is loosely but evenly distributed in the holding rings. The rings may then be provided with downwardly projecting flanges as will be described or I may use washer-like rings having preformed dependent flanges around the outer circumferences thereof.

In accordance with another modification of my invention, I provide a short corrugated cylinder over which I drape the material and I fasten the material to the corrugated cylinder as by brazing. I then force the corrugated cylinder with the mesh material fastened thereto into a tapered hole of my modified forming tool whereby the corrugations on the corrugated cylinder become deeper and the corrugated cylinder becomes smaller in diameter, resulting in the corrugated cylinder having loosely and evenly gathered material thereon having radially directed waves or folds.

Another method and apparatus for loosely and evenly gathering mesh material in a frame involves supplying a cylinder having an axial hole therein, the end of said cylinder being planar. A snubbing ring which fits around said cylinder, and a plunger which fits the axial hole are also supplied. A holding ring is laid on said planar end concentrically with said cylinder, the mesh material is draped over the cylinder and ring, and the snubbing ring is put over the cylinder and over the material where it fits snugly. Then the material is drawn into the axial hole by means of the plunger against the resistance of the snubbing ring and the material at the peripheral edges of the cylinder are fastened to the holding ring as by nesting a further holding ring over it with the material sandwiched therebetween.

Having gathered the material loosely and evenly in a frame or holder, I form the material into the required spherical form by laying the material while in its frame over the spherical heat treating tool. I then lay the weighting ring over the frame to apply force between the material and the spherical body and I heat the material to an elevated temperature on the spherical tool until the material takes, at least in part, the shape of the heating tool or ball, as will be explained more fully below.

In the following more detailed description of my invention, reference may be had to the drawings in which:

FIGURE 1 is a vertical section of apparatus made according to my invention and illustrating one step of my method of forming a ring and material assembly using flat metallic rings or washers;

FIGURE 2 shows the top-end view of the forming tool shown in FIGURE 1;

FIGURE 3 is a perspective view of a completed ring and material assembly showing the radial corrugations or folds of the material;

FIGURE 4 is a perspective view of a modified ring having corrugations in the top surface portion thereof;

FIGURE 5 is a vertical section of apparatus made according to my invention but using the ring shown in FIGURE 4;

FIGURE 6 is a vertical section of a die for reducing the diameter of a corrugated ring in accordance with another modification of my invention;

FIGURE 7 shows the corrugated ring before its diameter has been reduced;

FIGURE 8 shows the corrugated ring after its diameter has been reduced and also shows a ring to be placed around the circumference of the reduced ring;

FIGURE 9 illustrates apparatus according to my invention for heat treating the ring and mesh assembly to form the finished article; and FIGURES 10 and 11 show modifications of finished grids.

Referring to FIGURE 1, apparatus made according to my invention includes a forming tool 1 having a body portion 2 of elongated cylindrical cross-section and provided with a circular bore or hole 3 centrally and axially located therein. This forming tool also has radially extending teeth 4 on the upper end surface thereof as best shown in FIGURE 2 and for a purpose that will be disclosed below. An upper die 10 of annular shape is provided at its lower end with radial teeth 11 which mesh with the teeth 4 of the forming tool 1. This die has, in general, the shape of the forming tool 1. The teeth on the forming tool and die need be only 0.005 to 0.010 inch in depth and they need extend radially inwardly only a short distance beyond the inner edges of the rings 5 and 7 that will be used therewith as will be explained below. The annular die 12 slidably fits the upper die 10 and its lower edges are formed with a conical lip 13 and a clearance space 14. I also provide a plunger 8, which loosely fits the holes in the forming tool 1 and the die 10. The entrance into the hole 3 of the forming tool and the lower end of the plunger 8 may be rounded off so that the material will not be torn when the plunger is pushed into the hole 3.

In my process of providing spherical grids, I lay a first ring 5, which is originally flat or washer-shaped and which has an inside diameter less than the outside diameter of the forming tool 1 and an outside diameter substantially greater than the outside diameter of the forming tool 1, on the upper end of the forming tool 1 and arranged coaxially therewith. The inner diameter of the ring 5 must not be so small that the ring will cover the inner edges or ends of the teeth 4. I then lay the screen material 6 on ring 5. Since this screen material is so fine, no attempt is made to illustrate the holes therein or to show thickness thereof where it is illustrated in cross-section. I then lay another ring 7, having the same dimensions as ring 5, over the material and over the first ring. This second ring, however, may have a slightly greater outside diameter than the first ring for a purpose that will appear below. At this point in my process, the material is loosely sandwiched between the rings. The plunger 8 is then pushed against the screen material and into the hole 3 to take with it the material 6. This material will take the shape, at least in part, of the radial teeth 4 of the forming tool 1 due to the end exposure of the teeth by the ring 5 and due to the tension applied to this material by the plunger 8. No substantial stretching or flowing of the material takes place during the steps of producing the assembly of the rings and the loosely held material therein. A stop 9 may be provided to stop the plunger 8 at the lower end of its travel so that the proper amount of material may be gathered into the hole 3.

The upper die 10 of annular shape is pushed down concentrically with the forming tool 1 to cause the two rings 5 and 7 to take a shape corresponding to the mating teeth on the upper die and the forming tool. The annular die 12 is then pushed down around the forming tool 1 to bend over the peripheral edges of rings 5 and 7 by action of the conical lip 13 and the clearance space 14 to form dependent skirts on the rings 5 and 7. If the upper ring 7 has a slightly larger diameter than the lower ring 5, upon being bent down the dependent skirt of ring 7 will register with the dependent skirt on ring 5.

Extra material may be cut away from around the rings that hold the material together at any convenient point in my process. The rings are welded together in the skirt portion thereof to avoid damage during the welding operation to the material gathered and clamped between the rings.

As illustrated in FIGURE 3, the material 6 within the rings 5, 7 will be loosely but uniformly distributed therein and will exhibit substantially equally spaced radial waves or corrugations therein.

A further modification of my process involves the use of preformed rings 5' and 7' (see FIGURES 4 and 5). As illustrated in FIGURE 4, which for clearness shows only one of such preformed rings, the ring 7' comprises an upper washer-like member integrally fixed to a dependent skirt or cylinder. The washer-like member has therein radial teeth or bends or corrugations 17 which mesh with the teeth 4 of the forming tool 1. Another nesting ring 5' (see FIGURE 5) is used in this modification. This nesting ring 5' is substantially identical with ring 7', except that it is smaller so that it can fit inside ring 7' but leaving space for screen material 6 to be sandwiched therebetween.

In the process of making the ring and screen material assembly using the preformed rings 5', 7' such as are described, a ring 5' is put on the lower toothed end of the forming tool 1 and the material is draped over the tool and ring; the upper die 10 is brought down to the point where the material can move between the ring and the die without tearing and without permanent deformation. Then the plunger is pushed down to gather the material into the hole 3 in a sufficient amount and then the upper ring 7' is applied after the upper die 10 is removed to permit this step. The upper die 10 is then brought down tightly to force the rings 5' and 7' to nest and then, if necessary, the two rings are fastened together as by welding in the skirt region or by brazing.

Another method of assembling the holder and the evenly but loosely distributed screen material comprises utilizing a cylindrical ring 21 (see FIGURES 6 and 7) which has corrugations 22 therein, draping the screen material over the ring and securing it to the ring including the troughs as well as the crests of the corrugations as by light brazing, then forcing the corrugated ring through a tapered die 20 as shown in FIGURE 6. This die reduces the diameter of the ring when it is passed therethrough and in so doing it increases the depth of the corrugations. This, of course, results in the screen material being loosely and evenly held in the holder comprising the ring 22. If desired, a further holder ring 23 of L-shaped cross-section, as shown in FIGURE 8, may be added to the outside of the collapsed corrugated ring.

Having gathered very thin screen material loosely and evenly in a frame, I then give the material the required spherical form. To this end, I provide an oxidized chrome plated half-ball 18 of suitable size, and a weighing means here shown as a ring 19 and weighing from ½ an ounce to about 2 ounces and having a diameter about the same as that of the rings containing the screen material.

In providing the screen material with spherical shape, I place the assembly of screen material and its holder over the oxidized chrome plated half-ball 18 as shown in FIGURE 9. The weighing means 19 is applied on said ring assembly to supply the required tension on the material 6. The ball, with the ring assembly including the material therein, and the weighting means is placed in a vacuum or hydrogen furnace and heated to about 950° C. for about 25 minutes. The material then stretches in part due to the tension applied thereto by the weight and shrinks in part where it is not stretched due to the phenomena disclosed in my United States patent, Number 2,654,940, granted on October 13, 1953. The material due to these two effects takes the shape of the ball 18.

For example, as illustrated in FIGURE 10, if enough material is not gathered into the rings 5 and 7 before the heating step, the dome of material will have a spherical nose and convex sides after heat treatment. The convex sides result because the lack of material within the ring will not permit the weight on the ring to pull the ring down into contact with the chrome plated ball. In FIGURE 10, the portion 6 of the dome fits the half-ball 18 and is therefore spherical. However, the portion 6' of the dome is conical since it is stretched by the weight 19 but is not in contact with the half ball 12.

Without sufficient weight of the weighing means or if the stretching action of the weighing is stopped for any reason, the grid may take the shape shown in FIGURE 11, in which the portion 6 thereof is spherical since it contacts the ball but in which the portions 6" surrounding, but not contatcing, the ball is concave due to the greater shrinking of the material in the region between the ball and the ring. This concavity is due to lack of sufficient stretching of the material to conform it with the ball. The forms of grids shown in FIGURES 10 and 11 have utility similar to that of the spherical grid illustrated in FIGURE 9.

The temperature of the furnace may be from 800 to 1,000° C. but must be below the melting point of the screen material. The time of heating is largely dependent on the time for the shrinkage to take place as the shrinking process is slower than the stretching process.

While I have disclosed a weighting means which weighs from ½ an ounce to about 2 ounces, the weight may vary dependent on the material used, upon the thickness thereof, and to a certain extent upon the depth of the finally produced spherical grid.

As will be understood, screen material and thin imperforate sheet material can be formed into spherical domes by the method and process here disclosed. Examples of material used are copper and nickel although other material may be used. The portion of screen that may be formed is limited by the amount of material gathered into the rings and by the size of the rings as compared to the size of the oxidized chrome plated half-ball. Furthermore, it is to be understood that the half-ball 18 need not be truly spherical since it can be of any bulbous or convex shape. In fact, it may be concave in part and the screen may be made concave similarly thereto upon provision of further means to make the screen material fit into the concavity in the ball during the heat treatment step.

What is claimed is:

1. The method of giving a convex shape to thin, flat metallic material which comprises laying an annular ring on and transversely of an elongated forming tool having an axial hole therein, said forming tool having teeth extending radially towards said axial hole therein, applying said thin material over said ring and said tool, pushing said material into the hole in said forming tool and against said teeth to form a pocket of material having radially extending corrugations, fastening said material at the edges of said forming tool to said ring, removing said ring and material from said forming tool and inserting a convex tool into said pocket with said ring around a portion of said convex tool, applying weight to said ring and heating the material while on the convex tool to stretch said material in part and shrink said material in part to thereby shape said material to the shape of the convex tool.

2. The method of giving a convex shape to thin, flat metallic material which comprises laying an annular ring on a forming tool and disposed around a hole in said tool, applying said material over said ring and said tool, pushing said material into the hole in said forming tool and forming said material into a pocket having, around the circumference thereof, radially inwardly extending corrugations, thereafter securing the circumferential portions of said pocket to said ring, inserting a convex tool into said pocket with said ring disposed around a portion of said tool, applying a force to said material for stretching portions of said material around said tool, and simultaneously heating said material for shrinking other portions of said material.

References Cited by the Examiner

UNITED STATES PATENTS

| | | | |
|---|---|---|---|
| 13,651 | 10/55 | Lincoln | 140—107 |
| 32,457 | 6/61 | Allen | 140—107 |
| 2,282,392 | 5/42 | Bieling | 29—25.18 X |
| 2,439,424 | 4/48 | Goodloe | 29—163.5 X |
| 2,455,868 | 12/48 | Koch | 29—25.14 X |
| 2,577,103 | 12/51 | Brian | 29—25.14 |
| 2,581,997 | 1/52 | Beggs | 29—25.13 |
| 2,654,940 | 10/53 | Law | 29—25.17 |
| 2,732,511 | 1/56 | Dichter | 313—82 |
| 2,767,457 | 10/56 | Epstein | 29—25.13 |
| 2,773,212 | 12/56 | Hall | 313—82 |

FOREIGN PATENTS 554,099  6/43  Great Britain.

RICHARD EANES, JR., *Primary Examiner.*

ARTHUR GAUSS, WILLIAM W. DYER, JR., LEON PEAR, *Examiners.*